United States Patent
Kober et al.

(10) Patent No.: US 11,059,363 B2
(45) Date of Patent: Jul. 13, 2021

(54) BODY FLOOR STRUCTURE FOR A MOTOR VEHICLE HAVING A TRACTION BATTERY

(71) Applicant: Dr. Ing. h.c. F. Porsche Aktiengesellschaft, Stuttgart (DE)

(72) Inventors: Pascal Kober, Esslingen (DE); Steffen Kielwein, Leonberg (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 0 days.

(21) Appl. No.: 16/432,151

(22) Filed: Jun. 5, 2019

(65) Prior Publication Data

US 2019/0381878 A1 Dec. 19, 2019

(30) Foreign Application Priority Data

Jun. 13, 2018 (DE) ...................... 10 2018 114 097.5

(51) Int. Cl.
*B60K 1/04* (2019.01)
*B62D 25/20* (2006.01)

(52) U.S. Cl.
CPC ............ *B60K 1/04* (2013.01); *B62D 25/2009* (2013.01); *B60K 2001/0438* (2013.01); *B60Y 2306/01* (2013.01)

(58) Field of Classification Search
CPC .............................. B60K 1/04; B62D 25/2009
USPC ..................................... 296/193.07
See application file for complete search history.

(56) References Cited

U.S. PATENT DOCUMENTS

| 5,501,289 | A | * | 3/1996 | Nishikawa | ............ | B62D 21/12 |
| | | | | | | 180/68.5 |
| 2009/0021052 | A1 | * | 1/2009 | Kato | .................... | B62D 21/155 |
| | | | | | | 296/203.01 |
| 2010/0213741 | A1 | * | 8/2010 | Suzuki | ................. | B60N 2/4235 |
| | | | | | | 296/193.07 |
| 2012/0248822 | A1 | * | 10/2012 | Mildner | ............. | B62D 25/2018 |
| | | | | | | 296/193.07 |
| 2013/0313860 | A1 | * | 11/2013 | Yamaji | ................... | B62D 25/20 |
| | | | | | | 296/193.07 |

FOREIGN PATENT DOCUMENTS

DE 10 2009 006 990 8/2010
DE 10 2012 203 882 9/2013
(Continued)

OTHER PUBLICATIONS

German Search Report dated Mar. 29, 2019.
(Continued)

*Primary Examiner* — Joseph D. Pape
(74) *Attorney, Agent, or Firm* — Gerald E. Hespos; Michael J. Porco; Matthew T. Hespos

(57) ABSTRACT

A body floor structure (1) for a motor vehicle having a traction battery (2) includes a first longitudinal member (3) and a second longitudinal member (4) that extend in a vehicle longitudinal direction. A floor panel (5) spans between the two longitudinal members (3, 4). A central tunnel (6, 6') extends in the vehicle longitudinal direction and has a cavity (60, 60') and is configured for receiving equipment components of the motor vehicle. The traction battery (2) is arranged on a lower side of the body floor structure (1), and the cavity (60, 60') of the central tunnel (6, 6') is designed to be open in the direction of a vehicle interior (7).

5 Claims, 1 Drawing Sheet

(56) References Cited

FOREIGN PATENT DOCUMENTS

| | | |
|---|---|---|
| DE | 10 2013 016 824 | 4/2015 |
| DE | 10 2016 204 223 | 9/2017 |
| FR | 2 955 077 | 7/2011 |
| KR | 10-2011-0081607 | 7/2011 |
| KR | 10-1565980 | 11/2015 |

OTHER PUBLICATIONS

Korean Examination Report dated Aug. 20, 2020.
Korean Second Notice of Preliminary Rejection dated Apr. 8, 2021.

\* cited by examiner

BODY FLOOR STRUCTURE FOR A MOTOR VEHICLE HAVING A TRACTION BATTERY

CROSS REFERENCE TO RELATED APPLICATION

This application claims priority under 35 USC 119 to German Patent Appl. No. 10 2018 114 097.5 filed on Jun. 13, 2018, the entire disclosure of which is incorporated herein by reference.

BACKGROUND

Field of the Invention

The invention relates to a body floor structure for a motor vehicle having a traction battery. The body floor structure comprises first and second longitudinal members that extend in a vehicle longitudinal direction, and a floor panel spans between the two longitudinal members. A central tunnel extends in the vehicle longitudinal direction and has a cavity configured for receiving equipment components of the motor vehicle. The traction battery is arranged on a lower side of the body floor structure.

Related Art

Alternative drive designs are playing an increasingly more important role in the development of motor vehicles. All-electrically driven motor vehicles frequently are referred to as battery electric motor vehicles and have at least one electric machine as drive device. Hybrid vehicles have at least one electric machine in addition to an internal combustion engine. The vehicles are equipped with a traction battery for supplying electrical energy to the electric machine. Different mounting locations are conceivable for the traction battery, and one possible mounting location is on a lower side of a body floor structure.

Motor vehicles with an internal combustion engine as drive device customarily have a central tunnel that extends in the vehicle longitudinal direction. This central tunnel makes a contribution to the crash safety of the motor vehicle, since it is conceptually designed to dissipate some of the load acting on the motor vehicle in the event of a frontal impact. Moreover, such a central tunnel creates an installation space for different equipment components of the motor vehicle, such as, components of a transmission or an exhaust gas system of the motor vehicle. The central tunnel of a conventional motor vehicle may have an inverted U-shaped cross section that forms a downwardly open cavity. The equipment components to be accommodated within the central tunnel thus are mounted in the central tunnel from below and are situated in an outer region of the motor vehicle.

DE 10 2009 006 990 A1 discloses a body floor structure for a motor vehicle having a traction battery. The body floor structure has a central tunnel with an inverted U-shaped cross section and with a downwardly open cavity. This cavity is used for receiving the traction battery.

It has been shown that the arrangement of the traction battery on a lower side of the body floor structure between the first longitudinal member and the second longitudinal member which extend in the vehicle longitudinal direction offers numerous advantages. In addition to improving the crash behavior, the arrangement of the traction battery on the lower side of the body floor structure results in a lowering of the vehicle center of gravity, which can have a positive effect on the dynamic driving properties of the motor vehicle. However, by virtue of the fact that the cavity of the central tunnel is designed to be open downward, this cavity is blocked off by the traction battery arranged on the lower side of the body floor structure, and therefore no equipment components can be accommodated in the cavity of the central tunnel without the traction battery being demounted beforehand. This massively limits the usability of the central tunnel for receiving equipment components of the motor vehicle, since, for example in the case of a defect of one of the equipment components, the cavity of the central tunnel is accessible from below only after a laborious demounting of the traction battery.

The object of the invention is to provide a body floor structure for a motor vehicle having a traction battery and where the body floor structure is configured to improve the usability of the cavity of the central tunnel when a traction battery is arranged below the body floor structure.

SUMMARY

One aspect of the invention relates to a body floor structure configured so that the cavity of the central tunnel is open in the direction of a vehicle interior. Thus, the cavity of the central tunnel is configured to be open in the direction of the vehicle interior and is accessible from above from the vehicle interior. Accordingly, equipment components can be mounted easily within the upwardly open cavity in a very simple manner and without demounting the traction battery. More particularly, the disposition of the traction battery below the body floor structure does not impede use of the central tunnel as an installation space for equipment of the motor vehicle, such as electronic components. This results in considerable package advantages.

The central tunnel can have a substantially U-shaped cross section.

The central tunnel has a bottom and may further comprise first and second central tunnel walls that extend in the longitudinal direction of the body floor structure for laterally delimiting the cavity. The first and second central tunnel walls may have flat profiles and may define a substantially I-shaped cross section. The two flat profiles can be fastened on the upper side of the floor panel, for example, in an integrally bonded manner, such as by welding or adhesive bonding, or with suitable fasteners.

The bottom of the central tunnel can be formed by a portion of the floor panel that extends between the two central tunnel walls. It is thus not required for the central tunnel to have an additional bottom, since the bottom in this embodiment is formed by a portion of the floor panel between the two central tunnel walls. Dispensing with an additional bottom results in in weight advantages.

The central tunnel can be a profiled body with a substantially U-shaped cross section formed by the two central tunnel walls and with the bottom extending between the two central tunnel walls. The profiled body can be fastened on the upper side of the floor panel in an integrally bonded manner by welding or adhesive bonding, or with the aid of suitable fasteners.

The production and mounting of the central tunnel can be simplified by forming the profiled in one piece.

The traction battery may be fit to a lower side of the floor panel and may extend between the two longitudinal members. This mounting location of the traction battery results in improved properties of the motor vehicle in a crash situation.

The invention also relates to a motor vehicle having the above-described body floor structure and a traction battery fit to a lower side of the body floor structure.

Further features and advantages of the invention will become clear from the following description with reference to the appended drawings.

DETAILED DESCRIPTION

Figure 1:
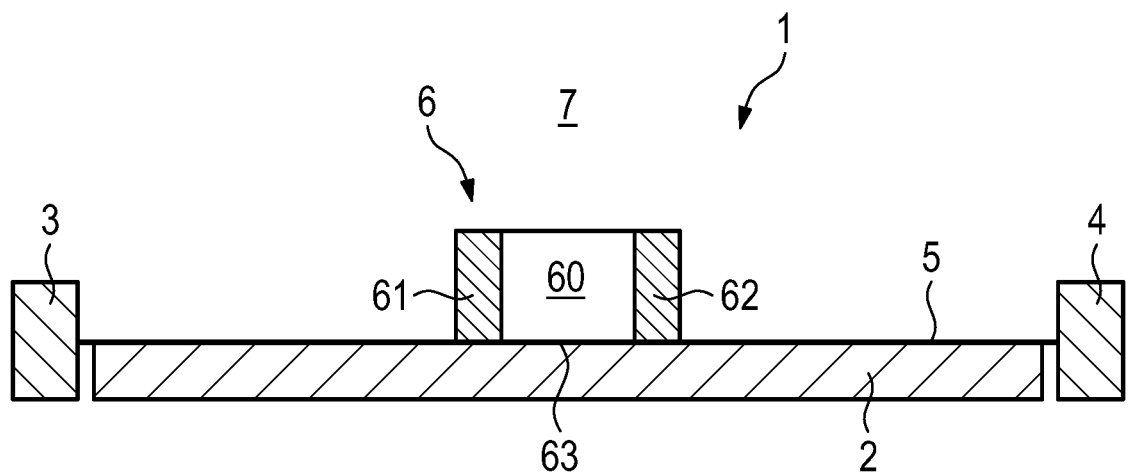
FIG. 1 is a schematic and highly simplified sectional view in the transverse direction of a body floor structure according to a first embodiment of the invention.

With reference to FIG. 1, a body floor structure 1 according to a first embodiment is intended for a battery electric vehicle or a hybrid vehicle having a traction battery 2. The body floor structure 1 has first and second longitudinal members 3 and 4 that extend substantially parallel to one another in the vehicle longitudinal direction (that is to say into the plane of the drawing). The body floor structure 1 also has a floor panel 5 that extends between the two longitudinal members 3, 4. The traction battery 2 is arranged on a lower side of the floor panel 5 and also extends between the two longitudinal members 3, 4.

The body floor structure 1 has a central tunnel 6 that also extends in the vehicle longitudinal direction. The central tunnel 6 serves, under stability aspects, for load dissipation in the event of a frontal impact of the motor vehicle and thereby improves the properties of the motor vehicle in a crash situation.

The central tunnel 6 has a cavity 60 that is configured to be open in the direction of a vehicle interior 7. This achieves a situation in which the cavity 60 is accessible from above, that is to say from the vehicle interior 7. Accordingly, additional components of the motor vehicle, such as, electronic components, can be received in the cavity 60 of the central tunnel 6. The accessibility of the cavity 60 of the central tunnel 6 from above and from the vehicle interior 7 enables equipment components to be mounted within the cavity 60 in a very simple manner and without, for instance, prior laborious demounting of the traction battery 2 being necessary. Thus, the cavity 60 that opens up and toward the vehicle interior can be used easily as an installation space for components of the vehicle, such as electronic components, even though the traction battery 2 arranged below the floor panel 5. This results in package advantages.

In the embodiment illustrated in FIG. 1, the cavity 60 of the central tunnel 6 is laterally delimited by a first and second central tunnel walls 61 and 62 that extend in the longitudinal direction of the body floor structure 1. The first and second central tunnel walls 61 and 62 are flat profiles of substantially I-shaped cross section and are fastened upright on an upper side of the floor panel 5. Moreover, the central tunnel 6 has a bottom 63 that is formed by a portion of the floor panel 5 that extends between the two central tunnel walls 61, 62. The two central tunnel walls 61, 62 configured as flat profiles can be fastened on the upper side of the floor panel 5, for example, in an integrally bonded manner, such as by welding or adhesive bonding, or with the aid of suitable fasteners (e. g. screws, bolts, rivets, clips or the like).

Figure 2:
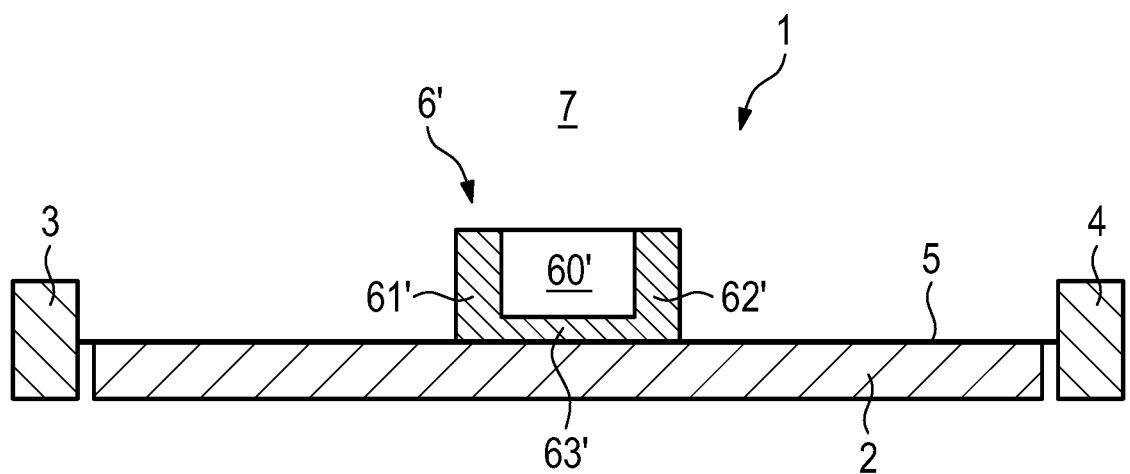
FIG. 2 is a schematic and highly simplified sectional view in the transverse direction of a body floor structure according to a second embodiment of the invention.

FIG. 2 illustrates a second embodiment of a body floor structure 1 for a motor vehicle having a traction battery 2. The body floor structure 1 again has first and second longitudinal members 3 and 4 that extend substantially parallel to one another in the vehicle longitudinal direction, and a floor panel 5 spans between the two longitudinal members 3, 4. The traction battery 2 is arranged on a lower side of the floor panel 5 and extends between the two longitudinal members 3, 4.

The body floor structure 1 further has a central tunnel 6' with a cavity 60' that is configured open in the direction of the vehicle interior 7. As described with respect to the first embodiment, the cavity 60' of the central tunnel 6' is accessible from above and from the vehicle interior 7. This measure again achieves a situation in which additional equipment components of the motor vehicle, such as electronic equipment components, can be accommodated in the cavity 60' of the central tunnel 6', thereby resulting in corresponding package advantages. Since the cavity 60' of the central tunnel 6' is accessible from above from the vehicle interior 7, mounting of the components in the cavity 60' can occur in a very simple manner without prior demounting of the traction battery 2 being necessary. It is thus possible, in spite of the traction battery 2 arranged below the floor panel 5, to use the upwardly open cavity 60' of the central tunnel 6' as an installation space for components of the motor vehicle.

By contrast with the first embodiment, in which the central tunnel 6 was formed by the two central tunnel walls 61, 62 and by the portion of the floor panel 5 extending between the two central tunnel walls 61, 62, the central tunnel 6' in this embodiment is a one-piece profiled body having a substantially U-shaped cross section and comprised of two central tunnel walls 61', 62' extending in the vehicle longitudinal direction and a bottom 63' extending between the two central tunnel walls 61', 62'. The central tunnel 6' that is designed as a profiled body can be fastened on the upper side of the floor panel 5, for example, in an integrally bonded manner, in particular by welding or adhesive bonding, or with the aid of suitable fasteners (e. g. screws, bolts, rivets, clips or the like).

What is claimed is:

1. A body floor structure for a motor vehicle having a traction battery, comprising:
    a first longitudinal member and a second longitudinal member that extend in a vehicle longitudinal direction;
    a floor panel that spans between the first and second longitudinal members, the floor panel having opposite upper and lower sides, the traction battery being arranged on the lower side of the floor panel and extending from a first position in proximity to the first longitudinal member to a second position in proximity to the second longitudinal member; and
    first and second central tunnel walls secured to the upper side of the floor panel to define a central tunnel extending in the vehicle longitudinal direction and defining an upwardly open cavity between the first and second tunnel walls, the cavity being open toward a vehicle interior and accessible from above so that equipment components of the motor vehicle can be received in the cavity and serviced from above without removing the traction battery, wherein the first central tunnel wall and the second central tunnel wall laterally delimit the cavity, and the cavity further has a bottom formed by a portion of the floor panel that extends between the two central tunnel walls.

2. The body floor structure of claim 1, wherein the central tunnel has a substantially U-shaped cross section.

3. The body floor structure of claim 1, wherein the first central tunnel wall and the second central tunnel wall are flat profiles that are fastened upright on an upper side of the floor panel.

4. The body floor structure of claim 1, further comprising the traction battery fit to a lower side of the floor panel.

5. A motor vehicle comprising: the body floor structure of claim 1 and a traction battery fit to a lower side of the body floor structure.

\* \* \* \* \*